Figure 25:
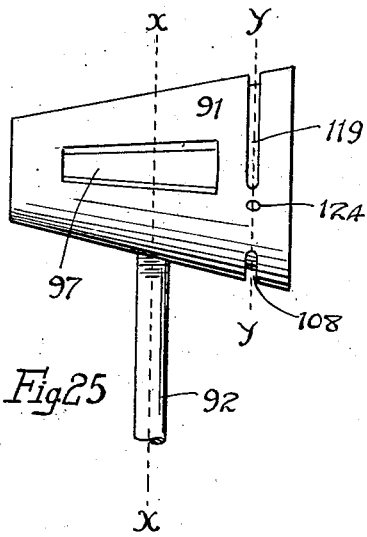

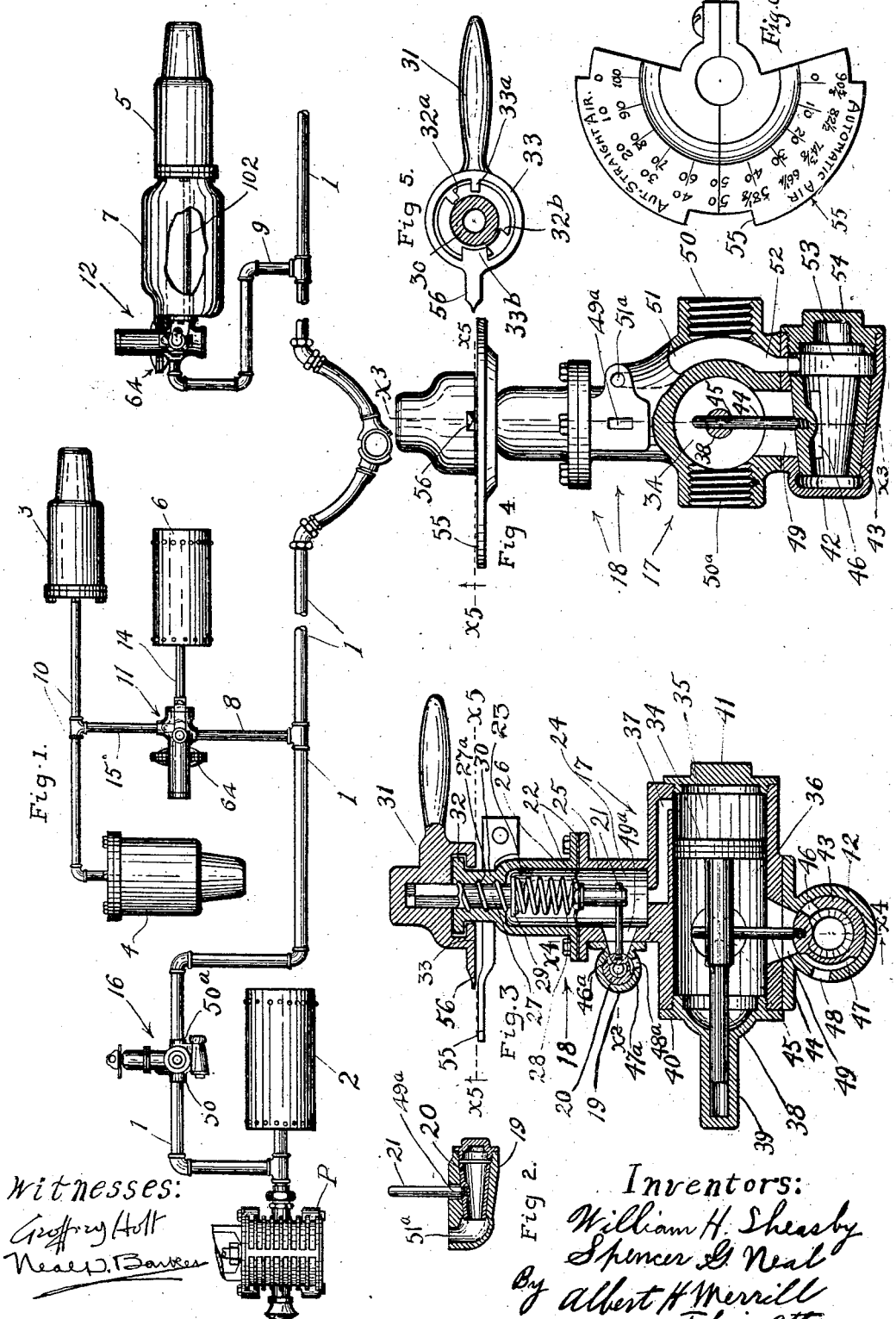

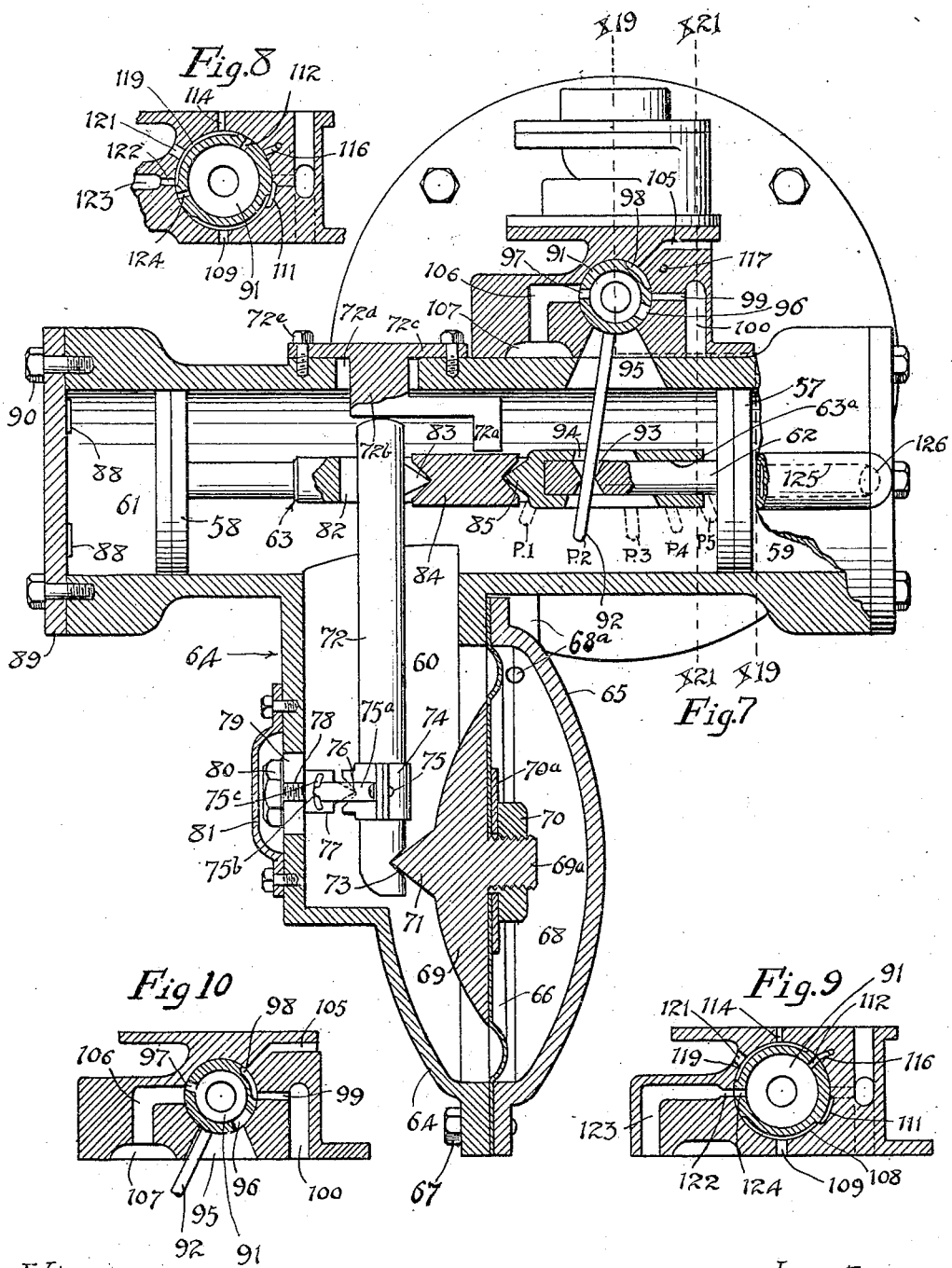

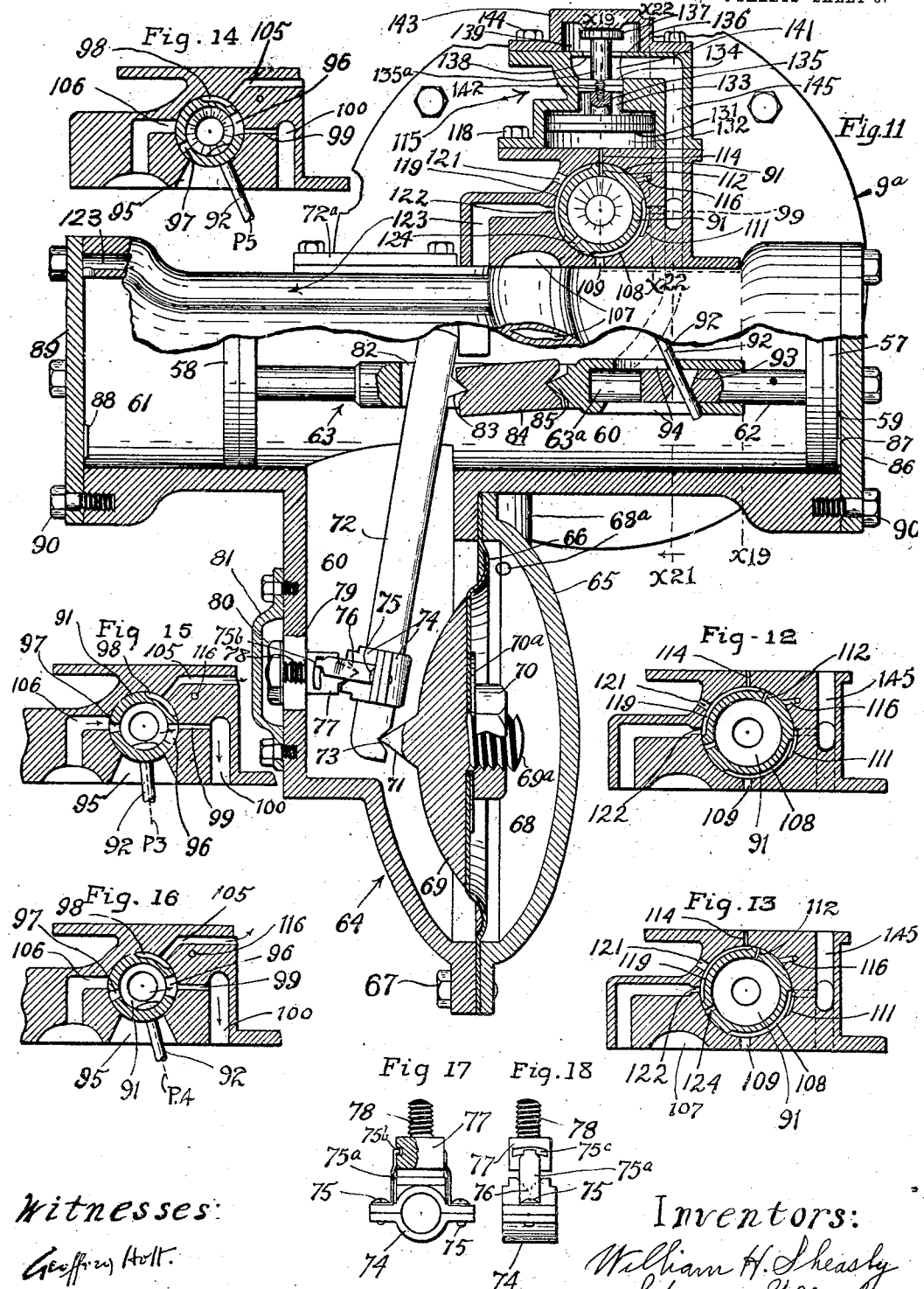

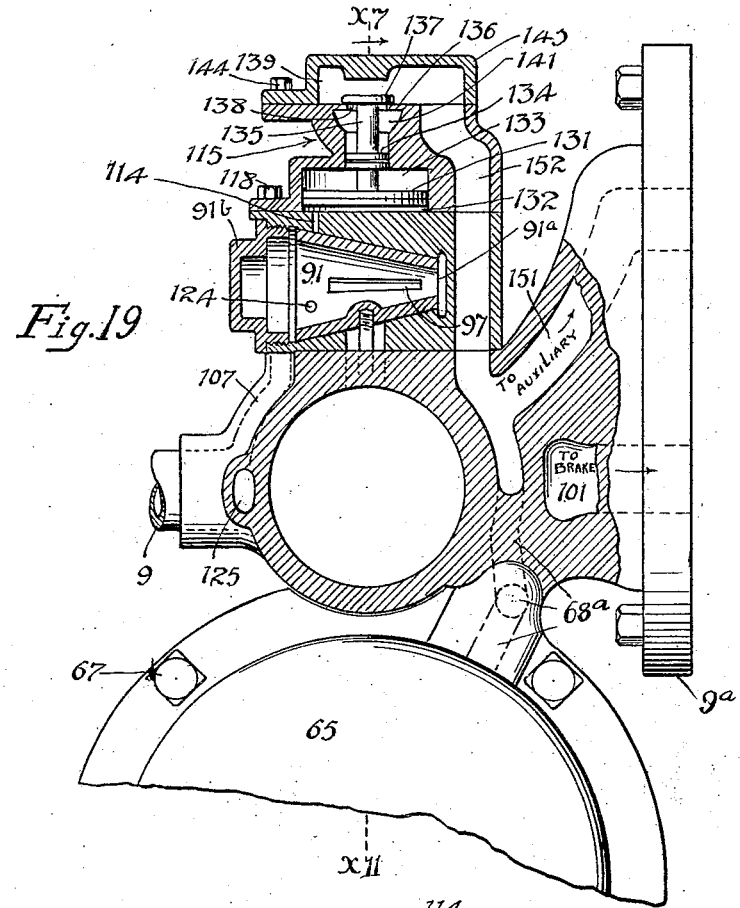
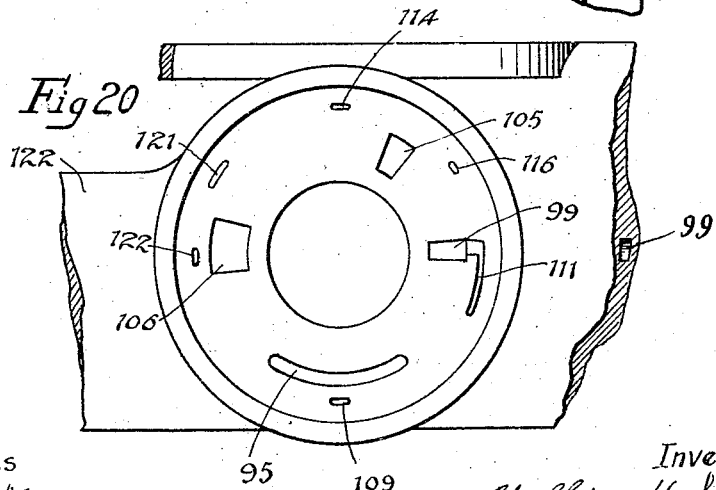

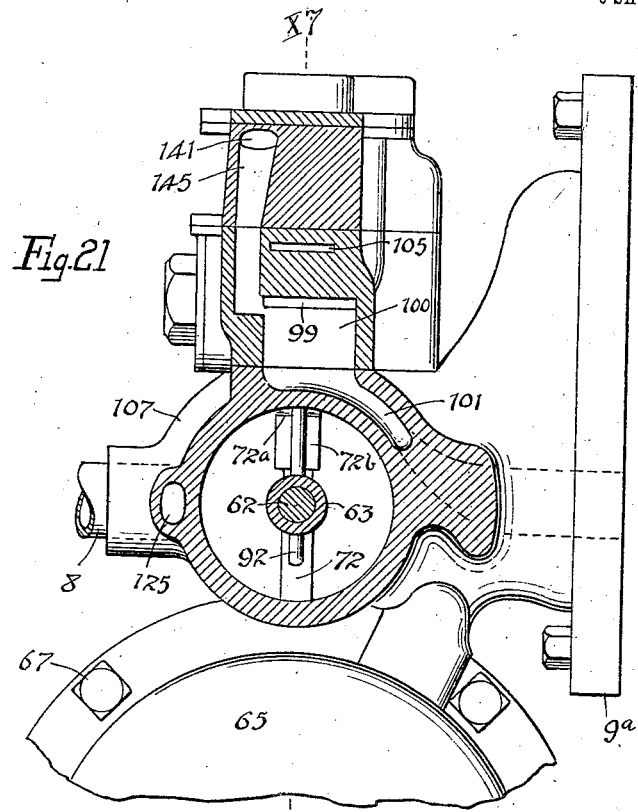
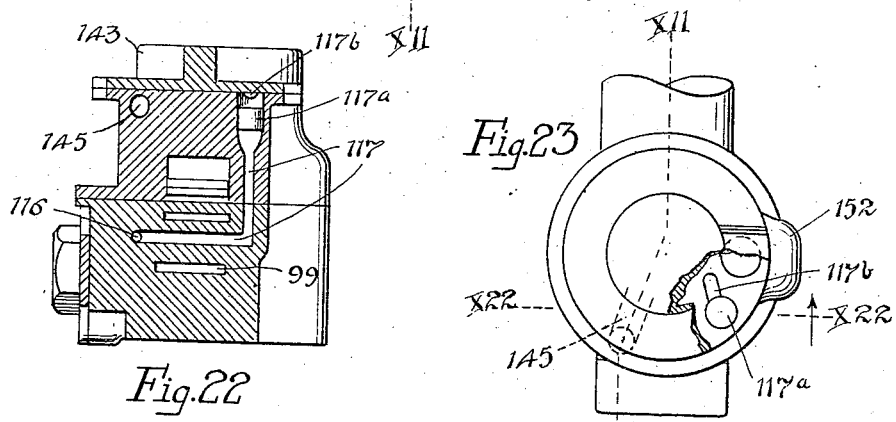
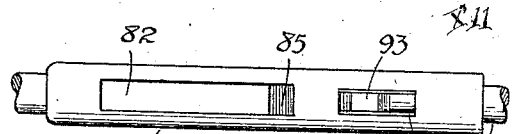

W. H. SHEASBY & S. G. NEAL.
AIR BRAKING APPARATUS FOR RAILWAYS.
APPLICATION FILED DEC. 10, 1908.

961,320.

Patented June 14, 1910.
3 SHEETS—SHEET 6.

Witnesses.

Inventors.
William H. Sheasby
Spencer G. Neal
by Albert H. Merrill
Their Atty

UNITED STATES PATENT OFFICE.

WILLIAM H. SHEASBY AND SPENCER G. NEAL, OF LOS ANGELES, CALIFORNIA, ASSIGNORS TO THE CALIFORNIA VALVE AND AIR BRAKE COMPANY, OF LOS ANGELES, CALIFORNIA, A CORPORATION OF CALIFORNIA.

AIR-BRAKING APPARATUS FOR RAILWAYS.

961,320.  Specification of Letters Patent.  Patented June 14, 1910.

Application filed December 10, 1908. Serial No. 466,799.

*To all whom it may concern:*

Be it known that we, WILLIAM H. SHEASBY and SPENCER G. NEAL, both citizens of the United States, and residents of the city of Los Angeles, county of Los Angeles, State of California, have invented a new and useful Air-Braking Apparatus for Railways, of which the following is a specification.

Among the objects of this invention are,—to provide means operated by a reduction of train pipe pressure to automatically supply air or other fluid pressure to the brake cylinders directly from the train pipe; to provide improved means to automatically maintain a uniform pressure in all brake cylinders of a train regardless of leaks and difference in extent of the travel of the pistons of the various brake cylinders; to dispense with the necessity of using auxiliary reservoirs except to obtain high brake cylinder pressures; to provide for the further use of the air released from the brake cylinders when the brake cylinder pressure exceeds the train pipe pressure; to reduce the friction of working parts; and to do away with the necessity of air-retainers for the brake cylinders.

Other objects and advantages will hereinafter appear to those skilled in the art to which the invention pertains.

In the practice of this invention, the method of applying compressed air to power brakes, may be termed "automatic straight," or, straight air automatically applied. It provides straight air for service applications and therefore holds in reserve maximum auxiliary reservoir pressure for use of engineers and train men or for automatic action in emergency, such as derailment or train parting.

Perfect equalization is normally maintained in train line, auxiliary reservoirs and triple valves. Straight air is applied by making reduction in train pipe pressure, which reduction automatically secures and maintains in the brake cylinders an increase of pressure equal to the amount of the reduction; or, if desired, a pressure double or triple the amount of reduction may be secured in the brake cylinders by variation in diameter of triple valve pistons.

This invention secures its results in a manner exactly the reverse of systems now in use which depend upon the unit storage system for regular service supply, so that when such supply is exhausted, control must be temporarily abandoned pending maximum restoration of a new supply for another application of the brakes. This system, on the contrary, maintains undisturbed the auxiliary supply for emergency only and does the service braking wholly with pressure direct from the main reservoir and pumps. This system therefore eliminates entirely the period of doubtful control on descending grades, which is one of the fundamental weaknesses of existing systems of power brakes, and which constitutes a constant menace in mountain service, and has charged against it many millions of dollars worth of property loss and startling lists of death and injury to train men on run-away trains, caused by periodical abandonment of control when most needed. This invention establishes and maintains, under any and all conditions, the highly essential guarantee of absolute control by delivering braking pressure direct to brake cylinders from main reservoir and pumps, and does this without dispensing with the automatic features required by law. Control of the brakes is never abandoned, because the braking pressure is built up from zero to the amount required and grade inequalities are dealt with by reducing or increasing the pressure on the brakes in such a manner as to maintain without variation any speed required to conform to schedule.

From the operation of this system is eliminated every dependence on the human factor other than the engineer. The necessity, hitherto existing, for train men turning up retainers or setting hand brakes has brought into the problem of operating trains on grades an element of widely varying uncertainty from the fact that many retainers and hand brakes are frequently found inoperative, and many others, by reason of position of loads, prove inaccessible, while train men are frequently prevented from reaching others owing to the make up of trains being such as to make progress from car to car not only slow and extremely hazardous, but often impossible,—a condition greatly aggravated by winter storms and icy surfaces.

Simplicity in detail and in general assembling of parts contributes largely toward securing the desirable results of this invention, braking being performed with an economy of air heretofore deemed impossible. All delicately adjusted parts, such as slides and springs and intricate mechanism so easy of disturbance under abnormal conditions which cause gumming and sticking and freezing with resultant disqualification of particular braking units, are eliminated. The functions of this system are also performed independently of possible shortcomings of the working parts of a braking unit, such, for example, as excessive piston travel, which are provided for and maximum braking duty secured regardless of such excessive travel, which, in all systems dependent upon storage units for service braking, destroys the efficiency of that particular braking unit, thus throwing an abnormal duty on some other unit, or, in other words, making one unit perform the work of two or more, with resultant abnormal heating of the wheels of the over-worked unit's car, thus causing an excessive expansion and contraction, often resulting in a fracture of such wheels and causing a disastrous wreck attended with loss of life. This system provides against reduction of air pressure by leakage and secures ideal results by maintaining perfect equality of braking pressure in all brake cylinders, eliminating the mischief of abnormal braking duty imposed on certain braking units in consequence of other units failing to do their part of the work.

Each car, in part, makes its own reduction, instead of, as in systems heretofore in use, the reduction passing only back through the engineer's valve to the atmosphere from the entire train. Application of brakes is therefore secured throughout an entire train, regardless of length, almost as a single unit. In this connection, it may be noted that the mischief of brakes leaking on or off, or of the brakes taking hold on head end first, resulting in the mischief called "bunching," or of brakes releasing on head end first and hanging on the rear end of the train, resulting in train separations, is wholly eliminated. Moreover, the undesired emergency application of brakes, technically called the "dynamiter", is not possible.

The air in each division of the train during each braking operation, including full release, is so positively sealed from interference that any condition not desired by the engineer is impossible.

This invention is believed to be a pioneer in invention except wherein its means for automatic application of straight air directly from the train pipe to brake cylinders may be regarded as an improvement upon the construction described in the application of Neal and Childress for a patent on means for operating railway brakes, filed June 12, 1908, Serial Number 438,197. In said application means are described for automatically applying straight air by an increase of train pipe pressure, whereas, by the construction hereinafter described, straight air is automatically applied by a reduction of train pipe pressure, so that trains now equipped with systems of the nature of well-known types may be furnished with one or more cars equipped with the braking apparatus hereinafter described, and the brakes of such cars be controlled by the same variations of pressure as govern the other cars of the train.

This braking system, like that described in the application for Letters-Patent already referred to, but by a different mode of operation, enables the engineer to employ either straight or automatic air through a single train pipe, as he may elect, and also provides for emergency application of brakes by conductor or train men and in case of the train parting.

The objects and advantages of this invention, in the herein described embodiment thereof, are secured by providing an improved triple valve operated by novel means controlled by variation of train pipe pressure and brake cylinder pressure acting in harmony against the auxiliary pressure.

With a view to obtaining the foregoing and other objects and advantages, this invention consists in such features, details of construction, combinations and sub-combinations of parts as will be described in connection with the accompanying drawings, and then more particularly pointed out and defined by generic and specific claims.

Figure 26:
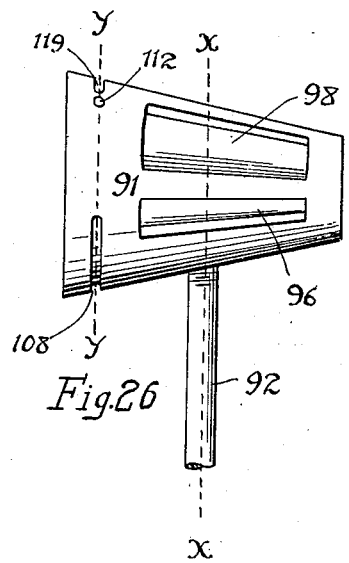
Figure 28:
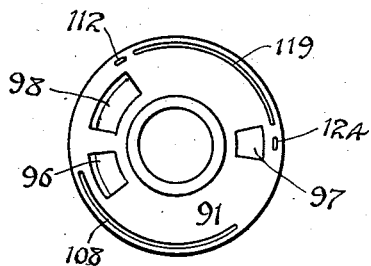
Figure 27:
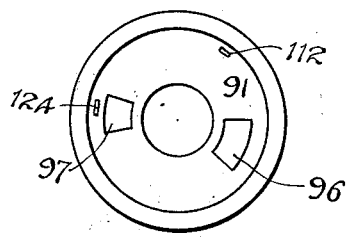

Referring to the accompanying drawings which illustrate the invention,—Figure 1 is a side elevational view of a braking equipment provided with fluid-controlling means constructed according to the principles of this invention, and adapted for mounting on a locomotive. The detached right hand portion of this view illustrates a continuation of the train line, and the braking apparatus thereof may be regarded as showing either the braking equipment of the tender of the engine or the equipment of a car. This figure is somewhat diagrammatic, some of the parts being shown out of true position. Fig. 2 is a fragmental plan section on line $x^2$ of Fig. 3. Fig. 3 is a longitudinal mid-section of the engineer's brake valve on line $x^3$ of Fig. 4. Fig. 4 is a side elevation of said valve partly sectioned on line $x^4$ of Fig. 3. Fig. 5 is a plan section looking up from line $x^5$ of Figs. 3 and 4. Fig. 6 is a plan view of the indicator of the engineer's brake valve. Fig. 7 is a longitudinal mid-section of the triple valve on line $x^7$—$x^{11}$ of Fig. 21. In this figure the triple valve is shown in the lap position for straight air. Fig. 8 is a fragmental cross-section of the plug and casing of the distributing valve on line $y$—$y$ of Figs. 25 and 26 showing the plug in lap position of straight air application. Fig. 9 is a cross-section similar to Fig. 8 but showing the valve in the release position of straight air application. Fig. 10 is a cross-section of the distributing valve on line $x$—$x$ of Figs. 25 and 26 also showing the valve in the release position of straight air application. Fig. 11 is a longitudinal midsection on line $y$—$y$ of Figs. 25 and 26 in regard to the valve plug, and approximately on line $x^7$—$x^{11}$ of Fig. 19 in regard to the rest of the view, the upper side of the cylinder being partly shown in side elevation. In this view the ports are shown in position for full application of automatic air. Irregular line $x^{11}$ of Fig. 23 shows the line of section through the secondary valve 115. Fig. 12 is a fragmental cross-section of the casing and plug showing the plug sectioned as in Fig. 11 but showing the plug turned to the position for full release of automatic air and full application of straight air. Fig. 13 is similar to Fig. 12 except that the plug is shown in lap position,—automatic air. Fig. 14 shows the plug sectioned on line $x$—$x$ of Figs. 25 and 26 in the same position as in Fig. 11,—full application of automatic air. Fig. 15 resembles Fig. 14 except that the plug is shown in position for full release of automatic air and full application of straight air. Fig. 16 is similar to Fig. 15 (sectioned on line $x$—$x$ of Figs. 25 and 26) except that the plug is in lap position,—automatic air. Fig. 17 is a plan of a detail of the fulcrum joint 74 and 77. Fig. 18 is a side view of Fig. 17. Fig. 19 is a cross-section on irregular line $x^{19}$ of Figs. 7 and 11. Fig. 20 is an enlarged view of the interior of the valve casing of the distributing valve looking into the large end thereof. Fig. 21 is a cross-section of the triple valve on line $x^{21}$ of Figs. 7 and 11. Fig. 22 is a vertical section of charging means for the auxiliary reservoir on line $x^{22}$ of Figs. 11 and 23. Fig. 23 is a broken plan of the valve shown in Fig. 22. Fig. 24 is a fragmental plan of a detail of the piston rod of the distributing valve. Fig. 25 is a side elevation of the plug of the distributing valve. Fig. 26 is a view similar to Fig. 25 except that the plug is viewed from the opposite side. Fig. 27 is a view of the interior of the plug of the distributing valve, looking into the large end thereof. In this figure, all the ports are shown where they appear on the interior of the plug. These ports are not shown on the internal surface of the plug in some of the other views where the smallness of the scale would make clear illustration difficult. Fig. 28 is a view of the exterior of the plug looking at the small end thereof.

In Fig. 1 is included the piping and chambers of a well-known braking system. In said figure, 1 designates the train pipe, 2 the main supply reservoir supplied from the pump P, 3 the truck brake cylinder of an engine, 4 its driver brake cylinder and 5 its tender brake cylinder. 6 is the auxiliary reservoir of the engine proper and 7 the auxiliary reservoir on the tender. A branch 8 of the train pipe supplies air from said pipe to the braking equipment of the engine and a branch 9 supplies air to the braking equipment of the tender. Brake cylinders 3 and 4 are connected by a pipe 10 which establishes free communication between said brake cylinders.

The triple valve to which this invention more particularly relates is shown in two places in Fig. 1, being there shown applied to the braking apparatus of the engine proper and also applied to the braking apparatus of the tender.

11 in a general way designates the triple valve where it is shown applied to the engine proper and 12 designates a valve likewise constructed and applied to the braking apparatus of the tender; or the valve designated 12 may be considered as being shown in connection with the brakes of a car of the train, the tender equipment and equipment of a car being the same.

The valve 11 communicates with the train pipe through pipe 8 already referred to, with the auxiliary reservoir 6 through a pipe 14, and by a pipe 15 with the supply pipe 10 of brake cylinders 3 and 4.

16 in a general way designates the engineer's brake valve. Referring to Figs. 3 and 4 for a clearer understanding of said brake valve 16,—17 designates the lower portion of said valve which constitutes the valve proper, and 18 the upper portion of said valve which constitutes a pilot valve for operating the same. Said pilot valve 18 comprises a casing 19 inclosing a plug 20 provided with a radial operating arm 21. Said pilot valve also comprises a diaphragm 22 which separates an upper chamber 23 from a lower chamber 24, the casings of said chambers 23 and 24 being preferably flanged at their contiguous ends and united together by bolts which form an air-tight fitting and clamp the diaphragm in place.

25 designates a pendent stem which extends through and is fastened to diaphragm 22 by a nut 26 in a well-known manner. Pendent stem 25 is slotted at its lower end as shown in section in Fig. 3 to receive the end of valve arm 21 and form an operative connection therewith.

27 is an externally threaded compression stem terminating within and just below the top of spring 28; said stem being provided with a collar 29 which seats upon said spring to compress the latter.

30 is a tubular standard having internal threads to coöperate with the external threads 27$^a$ of stem 27. Said stem 27 is angular at its upper end to fit the operating handle 31. The stem may slide with respect to said handle but cannot rotate therein. Standard 30 is provided at its top with a collar 32, having a small notch 32ª and a large notch 32ᵇ cut therein, and handle 31 is provided with a depending rim 33 having a narrow lug 33ª and a wide lug 33ᵇ adapted to slide through said notches and take under the collar to hold the handle in operative position. This construction of notches and lugs is provided to render the handle non-detachable and operative during nearly a complete revolution.

The lower portion 17, which forms the valve proper of the engineer's brake valve, is provided with a piston head 34 which divides the piston chamber thereby forming the operating chamber 35 and the equalizing chamber 36.

37 designates a passage at all times affording communication between chamber 24 of the pilot valve and operating chamber 35 of the valve proper.

Piston-rod 38 is carried at its right end by piston head 34 and is guided at its left end by a hollow extension 39 which is formed on the cap 40 that forms the closure for the left end of the chamber 36.

41 is a cap closing the right end of the chamber 35.

Within a valve casing 42 is a valve plug 43 which is operated by a radial arm 44 projected through a hole or short slot 45 through piston-rod 38 thus forming an operative connection between said rod and arm. Plug 43 is provided with a supply port 46 and release groove 47, said groove coöperating with a casing port 48.

49 designates an operating slot along which arm 44 operates, said slot also forming a supply and release port which coöperates with port 46 and groove 47.

Valve plugs 43 and 20 and their adjacent parts are desirably identical in form and arrangement of ports, said plugs being shown as differing only in size, except that the air is admitted to the small instead of the large end of the pilot valve plug as shown in Fig. 2 where 51ª designates the inlet to the pilot valve. The parts designated 46, 47, 48 and 49 where they appear in the valve proper, are respectively designated 46ª, 47ª, 48ª, and 49ª, in the pilot valve.

50 is a supply inlet (see Fig. 4) for the braking valve 16, said inlet receiving the air as it enters from the supply reservoir 2 through the portion of the train pipe 1 shown in Fig. 1 at the left of said brake valve 16. Said inlet has an upper branch 51 which admits air to the interior of the pilot valve plug 20, and a lower branch 52 which admits air to supply chamber 53 with which the open end of plug 43 communicates.

54 designates a cap closing the valve casing at the right of chamber 53.

50ª is an outlet leading to the section of train pipe 1 on the farther side of the braking valve.

By rotating handle 31 of the brake valve in one direction the threaded stem 27 will be depressed thereby compressing spring 28 and applying more pressure to the top of diaphragm 22, which pressure, if more than sufficient to oppose the resistance of the air in chamber 24, will depress the diaphragm and the pendent stem attached thereto thus also depressing valve arm 21 and rotating plug 20 of the pilot valve. Rotating the handle 31 in the reverse direction will produce opposite results.

To illustrate the manner in which the engineer's brake valve when properly adjusted automatically maintains the desired pressure in the train pipe line, let it be supposed that handle 31 of the pilot valve has been rotated sufficiently to so operate plug 20 of the pilot valve as to allow air from supply channel 51 (see Fig. 4) to enter chamber 24 and pass therefrom through channel 37 into chamber 35, and that the piston head 34 is therefore moved toward the left together with the piston rod 38 until the left end of said piston rod 38 strikes against the end of guide 39 maintaining port 46 of plug 43 in fully opened position. After the end of extension 39 limits the left hand movement of piston head 34 the pressure is confined against further expansion in chamber 35 and consequently increases in said chamber and also increases in chamber 34 of the pilot valve until said pressure operates with sufficient force against the lower side of diaphragm 22 to cause said diaphragm to yield upwardly against the set compression of spring 28 until the valve plug 20 moves to lap position shown in Fig. 3 thus maintaining constant the pressure which exists in chambers 24 and 35. It will be seen that the pressure in chamber 24 is now greater than it was before handle 31 was so rotated as to compress spring 28, because the rotation of said arm has further compressed spring 28 thus augmenting the pressure of diaphragm 19 so that a greater pressure under said diaphragm is necessary to bring it back to its original position.

While head 34 is in the left hand position and port 46 is consequently open to chamber 36 the pressure in the train pipe 1 and in chamber 36 will continue to increase until the pressure on the left hand side of piston head 34 begins to exceed that on the right hand side thereof. Said piston head 34 will then begin to move toward the right thus producing a greater pressure under diaphragm 22 and consequently rotating plug 20 to a position allowing air to gradually escape from chambers 35 and 24 through the groove 47ª and port 48ª. Piston head 34 will continue to move toward the right rotating plug 43 until said plug is brought to lap position cutting off further supply from main supply pipe 50 and channel 52, and stopping further compression of air in chambers 35 and 24, whereupon valve 20 comes to lap position automatically cuting off further escape of air from chambers 24 and 35 thus maintaining constant the amount of pressure for which spring 28 is set.

The degree of pressure attained in chamber 36 before plug 43 is brought to lap position will depend upon the degree of pressure maintained in chambers 24 and 35, being necessarily nearly as high as the pressure in said chambers, the friction of head 34 causing but a slight difference between the pressure on the right hand and left hand side thereof. Therefore, since by rotating arm 31 in a clockwise direction greater pressure is maintained in chambers 24 and 35, it necessarily follows that such operation of handle 31 results in causing and maintaining a corresponding increase of pressure in chamber 36 and in the train pipe line leading therefrom. Conversely, rotating handle 31 in an anti-clockwise direction will cause a reverse operation of the parts from that just described resulting in the escape of air from chamber 24 through groove 47ª and port 48ª thus lessening the pressure in chambers 24 and 35 causing piston head 34 to move toward the right and allowing air to escape from chamber 36 through groove 47 and release port 48, thus lessening the pressure in the train pipe until the pressure in said chamber 36 has decreased slightly below that in chamber 35, with the result that the pressure in chamber 35 moves piston head 34 toward the left and brings the valve to a lap position shown in Fig. 3 thus stopping further reduction of the train pipe pressure.

It will now be readily understood that a leakage from the train pipe will cause a reverse operation to that just described, automatically causing air to enter chamber 36 through ports 46 and 49 until the train pipe is supplied with a pressure sufficient to carry piston 34 back toward its original or lap position, thus cutting off further increase of pressure in the train pipe. If there is a steady leak from the train pipe the port 46 will remain opened wide enough to supply the amount of the leak.

55 designates a dial, and 56 a pointer carried by the handle-rim 33 to coöperate with said dial to indicate to the engineer the amount of pressure both in the train pipe and in the brake cylinders as will hereinafter be more fully set forth in connection with the description of the operation of the triple valve. The pressure in the train pipe and the brake cylinders may also be directly indicated to the engineer by means of the usual gages, not shown.

Referring to Fig. 6, the upper half of the dial indicates approximately the air pressures in the train pipe and brake cylinders during straight air application of the brakes; the figures on the lower half of said dial indicating such pressures during automatic application. On each half of the dial the inner figures indicate approximately the train pipe pressure, and the outer figures indicate brake cylinder pressure when the handle is so moved as to bring the pointer to the figures indicating the desired pressure.

Having now described the means for maintaining the desired pressure in the train pipe, means will next be described for building up and automatically maintaining pressure in the brake cylinders as desired by supplying them with air from the train pipe, this operation being accomplished by reduction of the train pipe pressure by operation of the engineer's brake valve, which may be continued until the pressures in the brake cylinders and train pipe approach and finally equal each other; and, after brake cylinder and train pipe pressure have thus been brought to an equality, means will be described for further increasing brake cylinder pressure by utilizing a still further reduction of train pipe pressure in a manner to cause auxiliary reservoir pressure to pass to the brake cylinders. The means for performing these operations by a reduction of train pipe pressure, is adapted to utilize an increase of such pressure in a manner to charge the auxiliary reservoirs from the train pipe. These operations are accomplished by providing a triple valve 12 on each car of the train to direct and control the air currents in the necessary manner.

Referring first to Fig. 7 the triple valves may each be constructed as a hollow casting provided with a cylindrical portion forming a piston chamber for piston heads 57 and 58, said piston heads dividing the piston chamber so as to form a train pipe chamber 59, a central or equalizing chamber 60, and a full release chamber 61. Piston head 57 is provided with an extensible stem 62 which slidably engages within a socket 63ª with which the right end of a piston rod 63 is provided. The left end of said piston rod is fastened to piston head 58.

Equalizing chamber 60 extends down into a hollow projection 64 with which the triple valve is provided. This projection is formed as a casting open at one side, the opening being covered by a flanged cap 65, a diaphragm 66 being interposed between said cap and the casting and clamped between said parts by means of bolts 67, thus forming a diaphragm chamber 68, whence passages 68ª and 151 lead to the auxiliary reservoir.

69 is preferably a plano-convex casting to reinforce the diaphragm. 69ª is a threaded boss projecting from the flat side of said casting through a central opening in diaphragm 66 and held thereto by a nut 70 screwing onto said boss, and against a washer 70ª. Said casting 69 is provided on the convex side thereof with a wedge-shaped projection 71 which forms a pivotal joint between casting 69 and the lower end of upright lever 72, said lever having a notch 73 to receive said projection 71. Said upright lever is provided with a fulcrum-collar 74 preferably formed in two flanged pieces united by screws 75 as shown in Figs. 17 and 18. Said collar is provided with a fulcrum-notch 76 which engages a fulcrum-block 77. Said block 77 is furnished with a threaded extension 78 which extends through a vertical slot 79 through the wall of the casting and is held in vertical adjustment in said slot by nut 80. 81 is a closure cap bolted over the slot to form an air-tight closure thereover.

Screws 75 hold in place L-shaped leaf springs 75ª, said springs bearing inwardly against the sides of the fulcrum-point of block 77. Said springs have inbent terminal portions 75ᵇ which enter grooves 75ᶜ in the sides of the fulcrum-joint and thus prevent the parts of the joint from becoming disengaged.

The upper end of lever 72 extends into a slot 82 with which piston rod 63 is provided and said lever is provided with a laterally projecting wedge-point 83.

84 is a joint-piece which extends longitudinally with respect to slot 82 and has a working fit therein. Said joint-piece is notched at each end, one notch engaging wedge-point 83, and the other notch engaging a point 85 which is formed in that end of slot 82.

To limit the movement of upright lever 72 toward the train pipe chamber, a stop member 72ª is provided, as best shown in Fig. 7. Said member is desirably a casting formed with a stop portion 72ᵇ against which the top of upright lever 72 strikes, to prevent head 57 from taking automatic positions except when train-pipe pressure is lower than brake cylinder pressure, as hereinafter described. Said member is also furnished with a flanged head 72ᶜ which is fastened within an opening 72ᵈ by means of cap-screws 72ᵉ.

The outward movement of piston-head 57 may be limited by providing the cylinder head 86 with inwardly projecting lugs 87. 88 are similar lugs formed on the cylinder head 89 to stop piston-head 58. The construction just described or some equivalent arrangement should be provided to prevent the piston-heads from seating on the heads of the cylinder and thus diminish or cut off the area exposed to pressure in chambers 59 and 61.

90 are cap-screws for holding on the cylinder-heads.

Plug 91 of the distributing valve is provided with a radial arm 92 which extends downwardly through a slot 93 in stem 62 within which it has a working fit as shown in Fig. 7. The socketed portion of piston-rod 63 also has a double slot 94 extending therethrough through which the valve arm 92 extends, said last mentioned slot being of sufficient length to allow the valve arm considerable play with relation to the piston-rod. 95 designates an operating slot adjacent plug 91. Said operating slot affords an opening to receive the valve arm 92 and also serves as a port which coöperates with plug port 96. Plug 91 is also provided on the same transverse plane with the operating slot and port just mentioned, with a port 97 and a groove 98 which are well shown in Figs. 25 and 26. Plug port 96 coöperates with casing port 99, said casing port leading to a larger passage 100 which leads around through the wall of the triple valve (see Fig. 21) to channel 101, thence by pipe 102 (see Fig. 1) through the auxiliary reservoir to the brake cylinder.

Plug groove 98, already referred to, opens and closes communication between casing port 99 and casing release port 105, said release port 105 leading directly to the atmosphere.

Plug port 97 establishes and cuts off communication between supply port 106 and the interior of the valve plug. Said port 106 leads to a larger passage 107 which extends along the cylinder casing to branch 8 of the train pipe (see Fig. 21). Fig. 20 illustrates the ports of the valve casing just described.

Referring now to Fig. 11, which shows the plug of the triple valve in section on line y—y of Figs. 25 and 26, 108 is an equalizing groove which is always in communication with casing port 109 which leads directly to the central or equalizing chamber 60. Said equalizing groove moves into and out of register with casing equalizing groove 111 and therefore establishes and cuts off communication between chamber 60 and said casing equalizing groove 111. Said groove 111 constitutes an extension of casing port 99 (already described) as best shown in Fig. 20.

In the embodiment of the invention illustrated in the drawings, each triple valve comprises, in addition to the distributing valve and means for operating valve arm 92 thereof, a secondary valve designated in a general way as 115. A plug port 112 moves into and out of register with a casing port 114, thus establishing and cutting off communication between said secondary valve.

Said port 112 also remains in communication with a charging port 116 whenever it is necessary to maintain communication between the interior of the valve plug and the auxiliary reservoir. Said charging port 116 leads by way of channel 117 (see Fig. 22) to the discharge passage of the secondary valve 115, thence to the auxiliary reservoir as will be more fully understood when said secondary valve is described.

The plugs of the triple valves are each desirably frusto-conical and hollow as well shown in Fig. 19. In said figure a clearance 91$^a$ is shown at the small end of the plug to render the same self-seating and to provide for automatically taking up the wear of the valve upon its seat. There is also a clearance at the large end of the plug where the screw cap 91$^b$ is provided for a closure.
The plug has no end port but is, nevertheless, at all times held to its conical seat by internal pressure admitted through one or the other of its side ports 96 and 97. These ports, and most of the other ports of the plug, and also a number of the casing ports are elongated as shown to provide for quick regulation of the volume of air passing through them, or, in other words, to provide greater port capacity by a minimum travel of the valve plug.

It is to be understood that the various passages which cross the dividing line between the distributing valve and the casing which contains the secondary valve 115 are formed in sections which coincide when said secondary valve is secured in place by means of the cap-screws 118.

119 is a secondary release groove which always remains in communication with a secondary release port 121 leading to the outer atmosphere. Said groove 119 moves into and out of register with port 114 and another port 122 and, owing to the groove being longer than the distance between said ports 114 and 122, the groove is adapted to throw either or both of said ports to release through port 121. Port 122 leads to channel 123 which in turn, leads to chamber 61 of the triple valve.
124 is a plug port for establishing and cutting off communication between the interior of the plug and chamber 61 by way of casing port 122 and passage 123.

Referring now to the construction of the secondary valve 115, the casing of said valve is furnished with a large piston-chamber wherein is fitted a piston-head 131, said head dividing said piston chamber into a lower chamber 132 and an upper chamber
133. The chamber 133 has a contracted upper portion wherein operates a small piston-head 134, heads 131 and 134 being secured to an upright piston-rod 135. Valve 115 is provided with a seat 136 upon which seats a disk 137 carried by the upper end of piston-rod 135 to open and close a passage 138 affording communication between an upper chamber 139 and a middle chamber 141. Owing to the passage 138 being of less diameter than disk 137, said disk cannot be inserted from underneath with the rest of the parts carried by the piston-rod. Therefore, in order to provide for assembling the piston-rod and piston-heads, the piston-rod is provided with a detachable upper portion 135$^a$ which has a contracted lower portion 142 that screws into a threaded socket formed in the upper end of the lower section of the piston-rod as shown where the piston-rod is broken away in Fig. 11. The top valve chamber 139 is formed by a flange closure cap 143 which is secured in place by cap-screws 144.

The purpose of check valve 117$^a$ in passage 117 (see Fig. 22) is to allow air to pass to the auxiliary reservoir as already described, but to guard against any possible back-flow therefrom. The plug of the triple valve will ordinarily prevent back-flow, but said check valve 117$^a$ is provided as an additional safeguard. 117$^b$ is a horizontal passage leading under the cap 143.

To charge the auxiliary reservoir, the train-pipe pressure is raised to the maximum until the valve is moved to the position of Figs. 9 and 10, thus effecting the full release of the brakes as will be explained later, and at the same time bringing charging port 112 of the plug into communication with port 116 of the casing, the air then flowing to the auxiliary reservoir by way of channel 117 (see Fig. 22), past check valve 117$^a$ through passage 117$^b$ to chamber 139 (see Fig. 19) thence by way of channel 152 to channel 151 which opens into the auxiliary reservoir.

145 is a brake cylinder supply passage leading from chamber 141 of the secondary valve into passage 100 (Figs. 7 and 11) to brake cylinder by way of passage 101 (see Figs. 19 and 21).

In supplying the brake cylinder with air from the auxiliary reservoir, the distributing valve is so operated (in a manner explained later) as to first cut off communication between the train line and the interior of plug 91 by moving plug port 97 from the position shown in Fig. 15 anti-clockwise out of communication with casing port 106 port 96 still remaining in register with casing port 99, as shown in Fig. 16, thus allowing the brake cylinder pressure to be registered within said plug. A further anti-clockwise movement of the plug brings its arm 92 to position $p^5$ (see Figs. 7, 11 and 14) still maintaining communication between the interior of the plug and the brake cylinder and bringing plug port 112 into register with casing port 114 allowing the brake cylinder pressure which is registered within the plug to pass through the two last mentioned ports into chamber 132 of the secondary valve. Such pressure will raise the large piston-head 131 together with the smaller upper piston-head 134 and, raising disk 137 off its seat, allowing air to pass from the auxiliary reservoir through a passage 151 (see Fig. 19) and the upwardly extending passage 152 into chamber 139 thence down into chamber 141, out through channel 145 (see Figs. 11 and 21) to enlargement 100 shown in Figs. 21 and 7, said enlargement 100 being provided with an extension 101 which leads to the brake cylinder by way of pipe 102 (Fig. 1).

There are two release positions of the triple valve, one, shown in Figs. 9 and 10, when a full release of brakes is effected with train line pressure above brake cylinder pressure; and the other release position known as automatic or preliminary release, shown in Figs. 12 and 15 is assumed when the train line pressure is below the brake cylinder pressure at the time of release, and can only be continued until the decreasing brake cylinder pressure and increasing train pipe pressure meet and equalize, after which triple valve will immediately assume full release or straight air release as in Figs. 9 and 10. That is to say, when the train-pipe pressure is considerably below brake cylinder pressure, an increase of the train-pipe pressure will (if such increased pressure still remain below brake cylinder pressure) cause a release of air from the brake cylinder into the train-pipe. A release of the brakes of this character is termed "preliminary" because if the train-pipe pressure is further increased the valve will upon another increase of train-pipe pressure being made assume the position shown in Figs. 9 and 10 (instead of the position of Figs. 12 and 15) thus releasing the brake cylinder pressure to the atmosphere.

In passing from the train pipe to the brake cylinder of a car, the air passes through branch pipe 9; thence into channel 125 (see Figs. 21 and 7) and through port 126 into the right end of the piston cylinder of the triple valve.

There is at no time direct communication between the train pipe chamber 59 and the central chamber 60. The train pipe, however, feeds both the central chamber 60 and the train pipe chamber 59, being in constant communication with the train pipe chamber and only intermittently in communication with the central chamber. The train pipe chamber 59 is always in communication with the train pipe through port 126 and channel 125 which leads to branch pipe 8 or 9 as shown in Fig. 1. The central chamber 60 is maintained in communication with the train pipe only during full release of the brakes, communication at such time being from branch pipe 8 or 9 through channel 107, see Figs. 11 and 19 thence through channel 106, port 97 into the distributing valve, port 96 of said valve to operating slot 95 to central chamber 60.

Assume the parts to be in the full release position first mentioned, shown in Figs. 9 and 10, the valve arm being in position $p^1$ (see dotted lines of Fig. 7) and the train line pressure one hundred pounds per square inch. In such case, this pressure of one hundred pounds will always exist in chambers 59, 60, 61 and 68, and also in the auxiliary reservoir, which is in communication with diaphragm chamber 68 at all times. When the pressure is the same in said diaphragm chamber as in train line chamber 59, the pressures in these chambers, considered by themselves, counterbalance each other because of the length of the arms of upright lever 72 on either side of its fulcrum being so proportioned to the areas of the pistons and diaphragm as to produce this result. To make a service application of the brakes under these circumstances, a reduction may be made in the train line pressure as in present systems, of, for instance, ten pounds, with the result that the opposition of the air in chamber 59 to the piston head 57 is lessened, allowing the air in chambers 61 and 68 to move the valve arm from the first toward the second position $p^2$. This movement may perhaps be aided by reason of the pressure being lowered in chamber 59 more quickly than in chamber 60 on account of the smallness of the opening between ports 96 and 95 when the valve is in the position shown in Fig. 10 causing the pressure in chamber 60 to reduce more slowly than that in chamber 59, so that the pressure in chamber 60 will be somewhat greater than that in chamber 59 while the reduction is being made. This state of facts may cause a temporary extension of the stem 62 from its socket, but, as soon as the right end of groove 108 (see Figs. 8 and 9) has come into communication with equalizing groove 111, the air in central chamber 60 will be released to the brake cylinder thus bringing the pressure in chamber 60 down to nearly zero, and allowing expansion of the air in diaphragm chamber 68 to move the valve arm to position $p^3$, opening a free communication between the train line and the brake cylinder.

Ports 123 and 124 are only in communication in full release position. It will be noticed that in service application air is released from chamber 61 (which said ports supply) thus allowing piston 57 and diaphragm 66 to equalize with each other with the aid of the brake cylinder pressure as described. But assuming the parts to be in full release position (see Figs. 9 and 10) the pressure will then be the same in all chambers of the triple valve which would be maximum train line pressure. It will be seen that by reducing the train line pressure the pressure in chamber 57 will also be reduced allowing the pressure in chamber 61 (which is now the greater pressure) to move piston rod 63 to the right. Extensible stem 62 will also aid in this operation as the lesser pressure on the right side of piston 57 will not resist that on the left side thereof which will cause a temporary extension of stem 62 which will rotate valve 91 and cause the triple valve to operate, thus reducing the train line pressure a predetermined number of pounds increasing by the same number of pounds the air pressure existing in the brake cylinder.

When the engineer has reduced train pipe pressure sufficiently to cause release of air from the train pipe to the brake cylinder as just described, the immediate effect of such release will be to further reduce the train pipe pressure by causing each distributing valve to aid in making a reduction of the train pipe pressure thus making a quicker and more uniform application of the brakes and causing a greater portion of the air which escapes from the train pipe to be put to useful work.

The operation will be readily understood when it is noted that the reduction of pressure on the inner side of one piston head offsets that on the inner side of the other, so that, by reducing the pressure in the central chamber, no movement of the piston-rod 63 is caused except that resulting from the expansion of the air in diaphragm chamber 68 and in the auxiliary reservoir connected therewith.

The result of the operation which brings the valve arm to position $p^3$ is to allow air to pass from the train pipe by way of branch pipe 9, (see Fig. 19) channel 107, channel 106, port 97, port 96, port 99 and enlarged continuation 100 of said port, thence through channel 101 (see Fig. 21) to brake cylinder. The air thus admitted from the train pipe to the brake cylinder now backs up from the brake cylinder by way of supply-and-release port 99, casing groove 111, plug groove 108 and port 109 to chamber 60, until the pressure in said chamber 60 has increased up to a point where the sum of the pressures in chambers 59 and 60 sufficiently exceeds the pressure in diaphragm chamber 68 to overcome the friction of the piston-heads in the cylinder; or, in other words, the pressure in chamber 60 will build up to and slightly exceed the amount of the difference in pressure between chambers 68 and 59, whereupon the increasing pressure in chamber 60 remains balanced as regards the piston heads but acts increasingly upon the inner side of the diaphragm until it puts a little more pressure against the left side of the diaphragm than was subtracted from the right hand side of piston head 57. This will carry the piston heads both to the left and will bring the valve arm back to lap position $p^2$ discontinuing the communication between the train pipe and brake cylinder. If, now, pressure in train pipe chamber 59 be brought down to eighty pounds, the existing pressure of ten pounds in chamber 60 against the left side of the diaphragm will not be aided sufficiently by the reduced pressure in chamber 59 to resist the constant pressure of 100 pounds in the diaphragm chamber 68, and consequently the valve arm will take position $p^3$ for full application as before. As already described, the brake cylinder pressure will again be built up in chamber 60 until the sum of the pressures in chambers 59 and 60 slightly exceeds the pressure in diaphragm chamber 68. Pressure in chamber 60 will now become slightly more than twenty pounds, that is, rise to an amount slightly more than the difference of pressure between chambers 59 and 68, before the valve again moves to lap position. Further successive reductions in the train pipe pressure will cause a repetition of the same operation until an air pressure of fifty pounds has been reached in chamber 59, such pressure being half that in chamber 68. When said reduction to fifty pounds is made in chamber 59, the valve arm will again come to position $p^3$ and open communication between the train line and the brake cylinder thus putting fifty pounds pressure in the brake cylinder. In order to bring the valve back again to position $p^2$, which is the lap position, the pressure would have to slightly exceed fifty pounds in chamber 60 if the mode of operation thus far described were to be continued; but under these conditions this is impossible because the train line pressure is now only fifty pounds. Therefore, communication between the train pipe and brake cylinder is now maintained. As the pressure is now equal in chambers 59 and 60, another ten pound reduction in train line chamber 59 will cause the pressure in said chamber 59 to be ten pounds lower than that in chamber 60. The pressure will then be greater on the left hand side of piston head 57 than on the right hand side thereof, with the result that, as the diaphragm and piston 63 cannot travel farther than to bring the valve arm to position $p^3$, rod 62 will be extended to bring the valve arm to position $p^5$ (see Fig. 11 for position of valve plug) thus cutting off the heretofore described communication between the train pipe and brake cylinder and simultaneously opening communication between the auxiliary reservoir and brake cylinder through the secondary valve 115. (Let it be remembered that central chamber 60 is still in communication with the brake cylinder and that diaphragm chamber 68 is always in communication with the auxiliary reservoir.) Since this last reduction of train pipe pressure so positions the valve as to establish communication between the auxiliary reservoir and brake cylinder, the pressure will be decreased in chamber 68 (by reason of decrease of auxiliary reservoir pressure) and raised in central chamber 60 until equalization takes place by reason of the pressure taken off from chamber 68 being added to that in chamber 60 until, aided by the pressure in chamber 59, the pressure in chamber 60 overcomes the pressure in the diaphragm chamber 68, and therefore carries the valve arm back to position $p^4$, or automatic lap. A further reduction of ten pounds, bringing the pressure to thirty pounds in the train pipe, will cause the operation just described to be repeated, thus producing still more pressure in the brake cylinder and still less in the train pipe and in the auxiliary reservoir.

Owing to the capacity of the auxiliary reservoir being about two and one-half times that of the brake cylinder, the auxiliary reservoir pressure in automatic application will not be decreased as much as the brake cylinder pressure will be increased, but will only be decreased in proportion to the above ratio. If, now, the pressure in the train pipe be brought from thirty pounds up to thirty-five pounds, the combined pressures in chambers 59 and 60 will overcome the pressure in chamber 68 thus carrying the valve arm to position $p^3$ reëstablishing communication between the train line and brake cylinder, the plug now returning to the same position as was described (and then called "full application") when position $p^3$ of the valve was first mentioned, but the stem 62 now being extended, see Figs. 14 and 17. The train pipe pressure still being lower than the brake cylinder pressure, the air will flow from the brake cylinder back into the train pipe, thus releasing slightly more than five pounds from the brake cylinder. In making this reduction of five pounds into the train pipe from chamber 60, the air escapes into channel 107 and thence to train pipe. This last operation, by lowering the pressure in chamber 60, allows the air in the diaphragm chamber to expand and bring the valve arm back to position $p^4$, which is the automatic lap position. The triple valve is shown provided with an attaching flange 9ª.

Although the word "air" is used throughout the specification and claims for convenience and brevity in speaking of the operations of the system, it is to be understood that the invention is not limited to the use of any particular fluid, but that the use of steam or other fluid in the train-pipe is contemplated, if found desirable.

What is claimed is:

1. In braking apparatus, a train pipe, means to vary pressure therein, a brake cylinder, means affording communication between said train pipe and brake cylinder, and means operated by reduction of train pipe pressure to open communication between the train pipe and brake cylinder, said means being operated by brake cylinder pressure to close communication between the brake cylinder and the train pipe.

2. In braking apparatus, a train pipe, means to vary pressure therein, a brake cylinder, means affording communication between said train pipe and brake cylinder, and a triple valve operated by reduction of train pipe pressure to open communication between the train pipe and brake cylinder, said means being operated by brake cylinder pressure to close communication between the brake cylinder and the train pipe.

3. In braking apparatus, a train pipe, means to vary pressure therein, a brake cylinder, a piston operated by train pipe pressure, and a valve operatively connected with said piston to open communication between the train pipe and brake cylinder when the train pipe pressure is reduced, said means being operated by brake cylinder pressure to close communication between the brake cylinder and the train pipe.

4. In braking apparatus, a train pipe, means to vary pressure therein, a brake cylinder, means of communication between said train pipe and brake cylinder, and means operated by reduction of train pipe pressure to open communication between the train pipe and brake cylinder, said last mentioned means being regulated by brake cylinder pressure.

5. In braking apparatus, a train pipe, means to vary pressure therein, a brake cylinder, means affording communication between said train pipe and brake cylinder, a valve to control such communication, means for opening said valve by a reduction of train pipe pressure, and yielding means tending to open said valve.

6. In braking apparatus, a train pipe, means to vary pressure therein, a brake cylinder, means affording communication between said train pipe and brake cylinder, a valve to control such communication, means for opening said valve by a reduction of train pipe pressure, and yielding means tending to open said valve, said yielding means being opposed by brake cylinder pressure.

7. In braking apparatus, a train pipe, means to vary pressure therein, a brake cylinder, means affording communication between said train pipe and brake cylinder, a valve to control said communication, means for opening said valve by a reduction of train pipe pressure, and a pneumatic spring provided with operating connections tending to open said valve.

8. In braking apparatus, a train pipe, means at one end thereof to increase and reduce pressure therein, a brake cylinder, means affording communication between said train pipe and brake cylinder, a valve to control said communication, and a pneumatic spring provided with operating connections tending to open said valve, an auxiliary reservoir, and means affording communication between said reservoir and the air chamber of said pneumatic spring, and means whereby the brake cylinder pressure will be opposed to the auxiliary reservoir pressure of the said pneumatic spring.

9. In braking apparatus, a train pipe, means to vary pressure therein, a brake cylinder, means affording communication between said train pipe and brake cylinder, a valve to control said communication, means for opening said valve by a reduction of train pipe pressure, a casing forming a diaphragm chamber, a diaphragm forming a wall of said chamber, there being a chamber on the other side of said diaphragm provided with means of communication with the brake cylinder, and operating means of connection between said diaphragm and the means for opening said valve, the pressure in said diaphragm chamber tending to open said valve.

10. In air braking apparatus, a train pipe, supply and exhaust means therefor adapted to be operated by the engineer, a brake cylinder, means affording communication between said train pipe and brake cylinder, a valve controlling said communication, a casing provided with a piston chamber in communication with the train pipe and at times in communication with the brake cylinder, a piston in said piston chamber, said piston being adapted to move in one direction under train pipe pressure, a diaphragm chamber, a diaphragm forming a side of said diaphragm chamber, means operatively connecting said diaphragm with said piston to cause the expansion of air in said diaphragm chamber to oppose the train line pressure upon said piston, and means operatively connecting said valve and piston.

11. In braking apparatus, a train pipe, supply and exhaust means therefor at one end thereof, a brake cylinder, an auxiliary reservoir, and a triple valve provided with a diaphragm and a diaphragm chamber in communication with said auxiliary reservoir, said triple valve having a valve proper operated in one direction by the pressure in said diaphragm chamber when the train pipe pressure is reduced to admit train pipe air to the brake cylinder and in the reverse direction by the train pipe pressure and brake cylinder pressure.

12. In a braking apparatus a train pipe, a brake cylinder, an auxiliary reservoir, a valve controlling communication between the train pipe and the brake cylinder, a diaphragm and chamber therefor, said chamber being in communication with the auxiliary reservoir, means whereby a reduction of train pipe pressure will permit the auxiliary reservoir pressure to move the diaphragm and open said valve to admit train pipe air to the brake cylinder, and means operated by train pipe air and brake cylinder air to move said diaphragm to close said valve.

13. In braking apparatus, a train pipe, a brake cylinder, means operating upon a reduction of train pipe pressure to open communication between said train pipe and brake cylinder to apply the brakes by train pipe pressure alone, and a diaphragm operatively connected with said means, said diaphragm being exposed to brake cylinder pressure which actuates said means.

14. In braking apparatus, a train pipe, a brake cylinder, an auxiliary reservoir, means affording communication between said train pipe and brake cylinder, and means operated by auxiliary reservoir pressure against brake cylinder pressure to open communication between said train pipe and brake cylinder while maintaining communication between the auxiliary reservoir and brake cylinder closed whereby the brakes will be applied by train pipe pressure alone.

15. In braking apparatus, a train pipe, a brake cylinder, an auxiliary reservoir, means to open communication between said train pipe and brake cylinder, and a diaphragm operatively connected with said means, said diaphragm being exposed to brake cylinder pressure on one side and to auxiliary reservoir pressure on the other side which overcomes the brake cylinder pressure in operating said means and places the train pipe in communication with the brake cylinder and maintains communication between the auxiliary reservoir and the brake cylinder closed whereby the brakes will be applied by train pipe pressure alone.

16. In braking apparatus, a train pipe, a brake cylinder, a casing containing a piston chamber, a piston in said chamber having two heads dividing said chamber into a train pipe chamber, central chamber and full release chamber, there being an extension of said casing which forms a diaphragm chamber, a diaphragm between said diaphragm chamber and central chamber, means operatively connecting said diaphragm with said piston, a valve controlling the supply of air from said train pipe to said central and full release chambers, and means operatively connecting said valve with said piston.

17. In braking apparatus, a train pipe, a brake cylinder, a casing containing a piston chamber, a piston in said chamber having two heads dividing said chamber into a train-pipe chamber, central chamber and full release chamber, a pneumatic spring, means operatively connecting said spring with said piston rod to oppose the pressure in said train line chamber, a valve controlling the supply of air from said train pipe to said full release and central chambers, and means operatively connecting said valve with said piston.

18. In braking apparatus, a train pipe, a brake cylinder, an auxiliary reservoir, a casing containing a piston chamber, a piston in said chamber having two heads dividing said chamber into a train pipe chamber, central chamber and full release chamber, a pneumatic device supplied with air from said auxiliary reservoir, means operatively connecting said device with said piston rod to oppose the pressure in said train pipe chamber, a valve controlling the supply of air from said train pipe to said full release and central chambers and to said brake cylinder, and means operatively connecting said valve with said piston.

19. In braking apparatus, a train pipe, a brake cylinder, an auxiliary reservoir, a casing containing a piston chamber, a piston in said chamber having two heads dividing said chamber into a train pipe chamber, central chamber and full release chamber, a diaphragm forming a portion of the wall of said central chamber, said diaphragm having its external side exposed to auxiliary reservoir pressure, means operatively connecting said diaphragm with said piston to oppose the pressure in said train pipe chamber, a valve controlling the supply of air from said train pipe to said full release and central chambers and to said brake cylinder, and means operatively connecting said valve with said piston.

20. In braking apparatus, a train pipe, a brake cylinder, a casing containing a piston chamber, a piston in said chamber, having heads dividing said chamber into a train pipe chamber, central chamber and full release chamber, a pneumatic device, means operatively connecting said device with said piston rod to oppose the pressure in said train pipe chamber, an extensible stem carried by the piston head next the train pipe chamber, stop means limiting the movement of the piston rod toward the train pipe chamber, a valve to control the supply of air from said train pipe to said central and full release chambers and to the brake cylinder, and means operatively connecting said valve with said extensible stem.

21. In braking apparatus, a train pipe, a brake cylinder, an auxiliary reservoir, a casing containing a piston chamber, a piston in said chamber having a head partitioning a train pipe chamber off from said piston chamber, a diaphragm forming a portion of the wall of the body portion of said piston chamber, said diaphragm having its external side exposed to auxiliary reservoir pressure, a rod in the piston chamber, an extensible stem projecting from said rod and fastened to said piston head, stop means limiting the movement of said rod toward said train pipe chamber, means operatively connecting said diaphragm with said rod to cause the auxiliary reservoir pressure upon said diaphragm to move said rod toward the train pipe chamber, a valve controlling the supply of air from said train pipe to the brake cylinder auxiliary reservoir and body portion of said piston chamber, and means operatively connecting said valve with said extensible stem.

22. In braking apparatus, a train pipe, a brake cylinder, a casing containing a piston chamber, a piston in said chamber having a head partitioning a train pipe chamber off therefrom, a diaphragm forming a portion of the wall of said piston chamber, a casing provided with a diaphragm chamber subjecting the external side of said diaphragm to pressure, a rod in the piston chamber, an extensible stem projecting from said rod and fastened to said piston head, means operatively connecting said diaphragm with said rod to cause the pressure upon the exterior of said diaphragm to move said rod toward the train pipe chamber, a valve controlling the supply of air from said train pipe to said brake cylinder and piston chamber, and means operatively connecting said rod with said extensible stem.

23. In braking apparatus, a train pipe, a brake cylinder, an auxiliary reservoir, and means operated by a reduction of train pipe pressure to open communication between said train pipe and brake cylinder while the pressure in the train pipe exceeds that in the brake cylinder, said means automatically placing the auxiliary reservoir in communication with said brake cylinder when the pressure in the train pipe falls below that in said brake cylinder.

24. In braking apparatus, a train pipe, a brake cylinder, an auxiliary reservoir, and means actuated by train pipe and brake cylinder pressure to open communication between said auxiliary reservoir and brake cylinder upon a reduction of train pipe pressure below brake cylinder pressure.

25. In braking apparatus, a train pipe, a brake cylinder, an auxiliary reservoir, means affording communication between said train pipe and brake cylinder, and a triple valve actuated by reduction of train pipe pressure to open communication between said train pipe and brake cylinder while train pipe valve for establishing communication between the auxiliary reservoir and brake cylinder, said secondary valve being operated by air pressure admitted thereto by said distributing valve upon a reduction of train-pipe pressure below brake cylinder pressure.

36. In braking apparatus, a train pipe, a brake cylinder, an auxiliary reservoir, a casing containing a piston chamber, a piston in said chamber, said piston being provided with two heads dividing said piston chamber into three compartments and having an extensible stem to which one of said heads is attached, the head to which said extensible stem is attached being subjected to train pipe pressure at the side farthest from the other piston head, a distributing valve plug operatively connected with said extensible stem, brake cylinder pressure being admitted to the chamber between said piston heads, and a secondary valve adapted to establish communication between the brake cylinder and auxiliary reservoir, said secondary valve being actuated by air pressure from the brake cylinder admitted thereto when said extensible stem is extended from the piston.

37. In braking apparatus, a train pipe, a brake cylinder, an auxiliary reservoir, a casing provided with a piston chamber, a plurality of piston heads in said chamber, means extensibly connecting said heads to form a central chamber therebetween, the outer face of one of said heads being exposed to train pipe pressure, a distributing valve member operatively connected with the piston head last mentioned, a diaphragm forming a portion of the wall of said central chamber, the exterior side of said diaphragm being exposed to auxiliary reservoir pressure, means operatively connecting said diaphragm with the means which connects the piston heads, and a secondary valve to control communication between the auxiliary reservoir and brake cylinder, said secondary valve being operated by air pressure admitted thereto under the control of said distributing valve member.

38. A triple valve comprising a valve plug, a casing containing a piston chamber, a piston in said chamber, said piston being provided with two heads, one of said heads being extensibly connected therewith, means operatively connecting said valve plug with said extensible head, said extensible head being exposed to train pipe pressure on the face thereof opposite said means, there being a central chamber between said piston heads, a diaphragm having one side exposed to the pressure of said central chamber, a casing forming a diaphragm chamber on the other side of said diaphragm, said piston heads being connected by a rod having an extensible and a non-extensible part, there being a slot through the non-extensible part of said rod, a joint piece having recessed ends in said slot, and a lever operatively connecting said diaphragm with said piston, said lever having a pointed part which engages one of the notches of said joint-piece.

39. In braking apparatus, a train pipe; a brake cylinder; a triple valve comprising operating means comprising a casing containing a piston chamber, a piston in said chamber, said piston having a head exposed on one side to train pipe pressure and during braking operations exposed on the other side to brake cylinder pressure, a diaphragm, a casing forming a diaphragm chamber on one side of said diaphragm, the other side of said diaphragm being exposed to the pressure of the portion of the piston chamber containing brake cylinder pressure, and a lever operatively connecting said diaphragm and piston.

40. In braking apparatus, a train pipe; a brake cylinder; and a triple valve, said triple valve having a hollow tapered plug to control communication between the train pipe and brake cylinder, said plug having peripheral openings affording continual communication between the interior thereof and the train pipe or brake cylinder to hold the plug to its seat.

41. A braking apparatus comprising a train pipe, a triple valve, a brake cylinder and an auxiliary reservoir, and means connected to the triple valve and operating by a reduction of train pipe pressure to permit air to flow from the train pipe to the brake cylinder until the brake cylinder pressure and the train pipe pressure equalize and then operating by a further decrease in train pipe pressure to put the auxiliary reservoir in communication with the brake cylinder to raise the brake cylinder pressure above the train pipe pressure, and then operating by an increase in train pipe pressure to permit the brake cylinder to discharge back into the train pipe.

42. A triple valve for an air brake apparatus comprising a valve to control communication between the train pipe, brake cylinder and auxiliary reservoir, and means connected to said valve and operated by a reduction of train pipe pressure to place the train pipe in direct communication with the brake cylinder to discharge air into said brake cylinder until the brake cylinder and train pipe pressures equalize and then operating by a further decrease in train pipe pressure to place the auxiliary reservoir in communication with the brake cylinder to bring the brake cylinder pressure above the train pipe pressure and then operating by an increase of train pipe pressure to place the brake cylinder in communication with the train pipe to discharge air from the brake cylinder back into the train pipe.

43. A braking apparatus comprising a pressure exceeds brake cylinder pressure, said valve automatically opening communication between said auxiliary reservoir and brake cylinder upon the pressure in the train pipe falling below the brake cylinder pressure.

26. In braking apparatus, a train pipe, a brake cylinder, and means operated by a reduction of train pipe pressure to open communication between said train pipe and brake cylinder, said means also opening communication between said train pipe and brake cylinder when train pipe pressure is increased to an excess over brake cylinder pressure.

27. In braking apparatus, a train pipe, a brake cylinder, a valve to control communication between said train pipe and brake cylinder, a casing containing a piston chamber, a piston in said chamber, means operatively connecting said valve with said piston, a diaphragm, means operatively connecting said diaphragm with said piston, an auxiliary reservoir, and means to supply air pressure from said auxiliary reservoir to said diaphragm and means to supply brake cylinder air to the other side of said diaphragm.

28. In braking apparatus, a train pipe, a brake cylinder, a valve to control communication between said train pipe and brake cylinder, a casing containing a piston chamber, a piston in said chamber, means operatively connecting said valve with said piston, a casing having an air chamber, a movable wall forming a side of said chamber last named, an auxiliary reservoir, means affording communication between said air chamber and auxiliary reservoir, and means operatively connecting said movable wall with said piston and means for supplying air to said movable wall in opposition to the auxiliary reservoir air.

29. In braking apparatus, a train pipe, a brake cylinder, a valve to control communication between said train pipe and brake cylinder, a casing containing a piston chamber, a piston in said chamber, means operatively connecting said valve with said piston, a casing having an air chamber, a movable wall forming a side of said air chamber, an auxiliary reservoir in communication with said air chamber, and a lever operatively connecting said movable wall with said piston and means for supplying brake cylinder air to the other side of said movable wall in opposition to the auxiliary reservoir air.

30. In braking apparatus, a train pipe, a brake cylinder, an auxiliary reservoir, a casing containing a piston chamber, a distributing valve to control communication between said pipe, cylinder, reservoir, and piston chamber, a piston in said piston chamber, means operatively connecting said valve with said piston, a diaphragm exposed on one side to the air in said piston chamber and on the other side to auxiliary reservoir pressure, and means operatively connecting said piston and diaphragm.

31. In braking apparatus, a train pipe, a brake cylinder, an auxiliary reservoir, a casing containing a piston chamber, a distributing valve to control communication between said pipe, cylinder, reservoir, and piston chamber, a piston in said chamber, means operatively connecting said valve with said piston, a diaphragm exposed on one side to the pressure in said piston chamber and on the other side to auxiliary reservoir pressure, and a lever operatively connecting said piston and diaphragm.

32. In braking apparatus, a train pipe, a brake cylinder, an auxiliary reservoir, a casing containing a piston chamber, a distributing valve to control communication between said pipe, cylinder, reservoir, and piston chamber, a piston in said piston chamber, means operatively connecting said valve with said piston, a diaphragm exposed on one side to the pressure in said piston chamber and on the other side to the auxiliary reservoir pressure, a lever operatively connecting said piston and diaphragm, and means to provide a fulcrum for said lever, said piston having a head of different area than the working area of said diaphragm and said lever being fulcrumed to balance said head and diaphragm when the sum of the train pipe and piston chamber pressures equal the auxiliary reservoir pressure.

33. In braking apparatus, a train pipe, a brake cylinder, an auxiliary reservoir, a casing containing a piston chamber, a piston in said piston chamber having two heads which divide said piston chamber into a release chamber, a central chamber, and a train pipe chamber, a distributing valve and a secondary valve controlled by said distributing valve, said distributing valve directly controlling communication between said train pipe and brake cylinder and actuating said secondary valve to charge said auxiliary reservoir.

34. In braking apparatus, a train pipe, a brake cylinder, an auxiliary reservoir, means to open communication between said train pipe and brake cylinder, and a diaphragm operatively connected with said means, said diaphragm being exposed to auxiliary reservoir pressure which actuates said means and to brake cylinder pressure which opposes the auxiliary reservoir pressure.

35. In braking apparatus, a train pipe, a brake cylinder, an auxiliary reservoir, a casing containing a piston chamber, a piston in said piston chamber, a distributing valve, said distributing valve being operated by reductions of train pipe pressure to release air from the train-pipe to the brake cylinder until equality of train-pipe and brake cylinder pressure is produced, and a secondary train pipe, a series of brake cylinders, an auxiliary reservoir for each brake cylinder, a valve controlling communication between each brake cylinder and its auxiliary reservoir, means operated by an increase of train pipe pressure to move the valves to place the brake cylinders in communication with the train pipe when the brake cylinder pressure is above train pipe pressure to discharge air from said cylinders back into the train pipe, whereby a wave of increased pressure will move down the train pipe with increasing force and will operate each valve in succession as it moves along said pipe.

44. A braking apparatus comprising a train pipe, means for maintaining pressure therein, a brake cylinder, an auxiliary reservoir, a valve controlling communication between the brake cylinder, reservoir and train pipe, and means operated by an increase in train pipe pressure to discharge air from the brake cylinder into the train pipe for a gradual release of the brakes and to discharge it from the brake cylinder into the atmosphere for a full release of the brakes.

45. A braking apparatus comprising a train pipe, a brake cylinder, an auxiliary reservoir, a valve controlling communication between the brake cylinder, auxiliary reservoir and train pipe, means connected to the valve and operated by a reduction in train pipe pressure to permit air to flow from the train pipe to the brake cylinder until the brake cylinder and train pipe pressures equalize and by a further reduction in train pipe pressure to permit air to flow from the auxiliary reservoir to the brake cylinder and then operated by an increase of train pipe pressure to permit air to flow from the brake cylinder back to the train pipe for a gradual release of the brakes and by a further increase of train pipe pressure to permit air to flow from the brake cylinder to atmosphere for a full release of the brakes.

46. In braking apparatus, a train pipe, a brake cylinder, an auxiliary reservoir, and means actuated by brake cylinder pressure to open communication between said auxiliary reservoir and brake cylinder upon a reduction of train pipe pressure below brake cylinder pressure.

47. In braking apparatus, a train pipe, a brake cylinder, an auxiliary reservoir, and means actuated by train pipe and brake cylinder pressure to automatically close communication between said train pipe and brake cylinder after a reduction of train pipe pressure.

48. In braking apparatus, a train pipe, a brake cylinder, and means actuated by auxiliary reservoir pressure in opposition to brake cylinder pressure to automatically open communication between the train pipe and brake cylinder to maintain a predetermined pressure in the brake cylinder.

49. In braking apparatus, a train pipe, a brake cylinder, and means actuated by auxiliary reservoir pressure in opposition to brake cylinder pressure to automatically open communication between the auxiliary reservoir and brake cylinder to maintain a predetermined pressure in the brake cylinder.

50. In braking apparatus, a train pipe, supply and exhaust means therefor at one end thereof, a brake cylinder, an auxiliary reservoir, and a triple valve provided with a diaphragm and a diaphragm chamber in communication with said auxiliary reservoir, said triple valve having a valve proper, a movement-multiplying means connecting the diaphragm with the valve proper of the triple valve whereby said valve proper will be operated in one direction by the pressure in said diaphragm chamber and in the reverse direction by the train pipe pressure.

51. In a braking apparatus, a train pipe, a brake cylinder, means to open communication between said train pipe and brake cylinder, a diaphragm, a movement-multiplying means operatively connecting said diaphragm with said means, said diaphragm being exposed to brake cylinder pressure.

52. In a braking apparatus, a brake cylinder, an auxiliary reservoir, a valve to open communication between said train pipe and brake cylinder, a diaphragm, a movement multiplying means operatively connected with said diaphragm and said valve, said diaphragm being exposed to brake cylinder pressure on one side and to auxiliary reservoir pressure on the other side.

53. In a braking apparatus a train pipe, a brake cylinder, an auxiliary reservoir, a flexible diaphragm exposed to auxiliary reservoir pressure on one side and brake cylinder pressure on the other side, a triple valve, means operatively connecting the diaphragm to the triple valve to automatically open communication between the train pipe and the brake cylinder to maintain a predetermined pressure in the brake cylinder.

In testimony whereof we have hereunto signed our names in the presence of two subscribing witnesses at Los Angeles, California, this 5th day of December, 1908.

WILLIAM H. SHEASBY.
SPENCER G. NEAL.

Witnesses:
ALBERT H. MERRILL,
FLORA H. FOSS.